Aug. 19, 1958 H. G. ROY 2,847,733
ARTIFICIAL LUMBER PRODUCTS AND THEIR MANUFACTURE
Filed Sept. 2, 1955 2 Sheets-Sheet 1
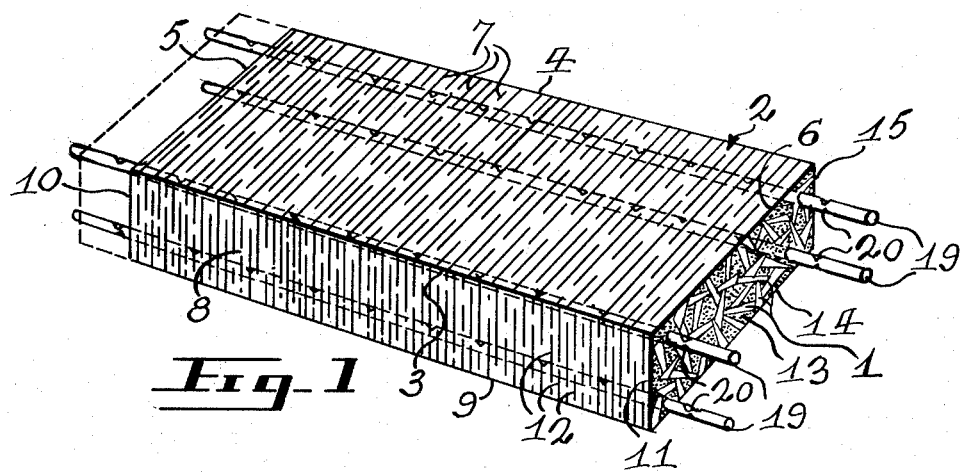
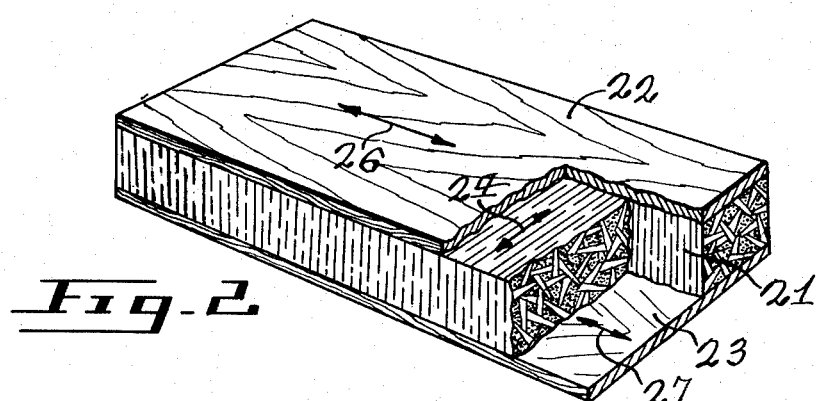
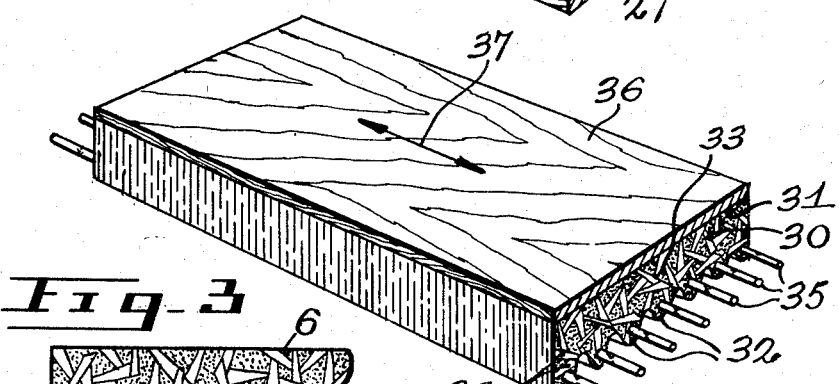
Inventor
Henri Georges Roy
By Alan Swabey
Attorney

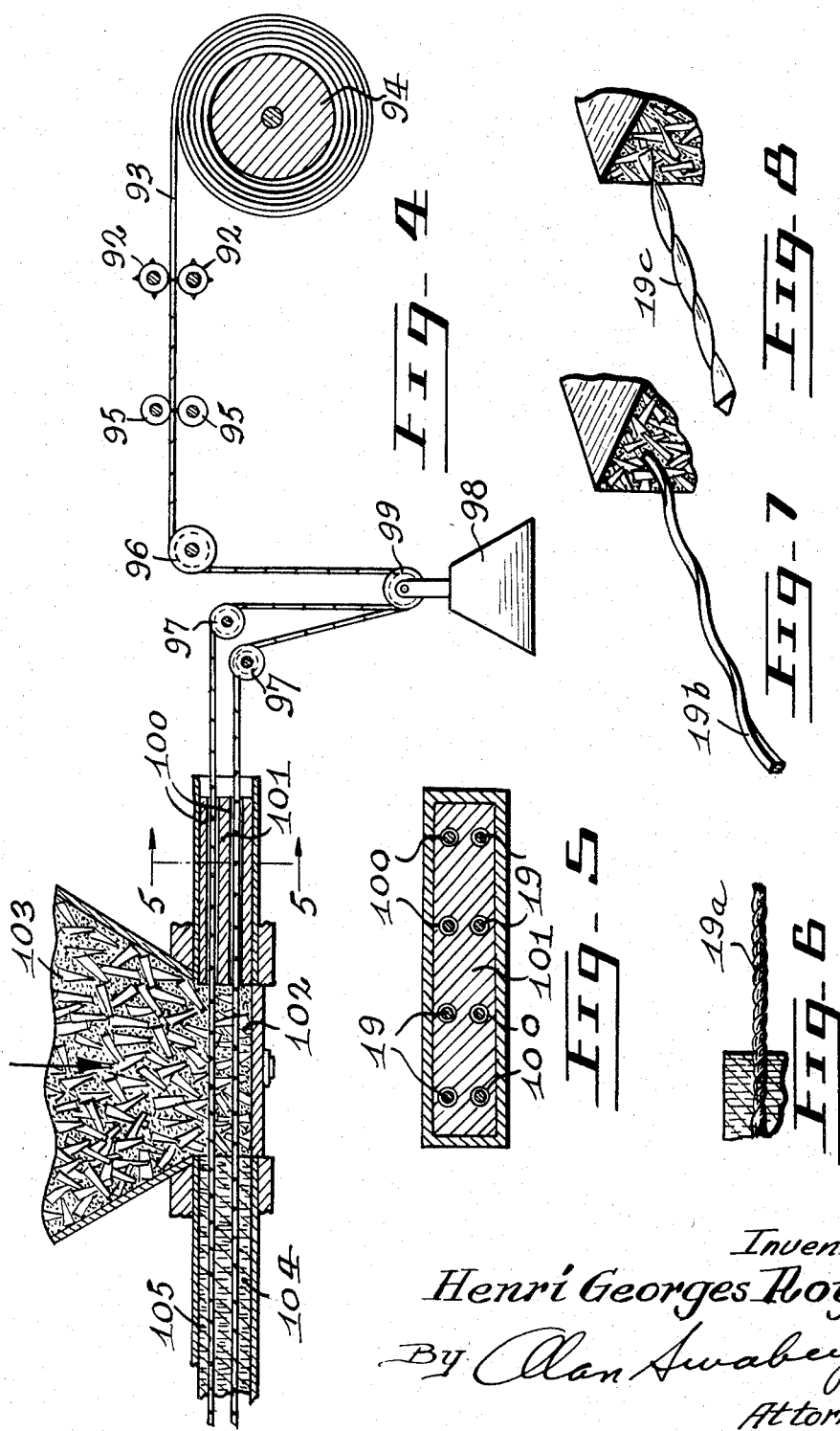

United States Patent Office 2,847,733
Patented Aug. 19, 1958

2,847,733

ARTIFICIAL LUMBER PRODUCTS AND THEIR MANUFACTURE

Henri Georges Roy, Ste. Rose, Quebec, Canada

Application September 2, 1955, Serial No. 532,355

16 Claims. (Cl. 20—91)

This invention relates to new wood products, in the form of artificial lumber, as articles of manufacture.

The present application, which is a continuation-in-part of co-pending application, Serial No. 216,403, describes inter alia improved boards and slabs made up of lignocellulosic particles bonded together by a hardened synthetic resin binder.

Prior art

The manufacture of artificial lumber products is not new. During the last twenty years an increasing volume of flat boards and slabs has been made from small wood particles permanently glued together by thermosetting synthetic resin adhesives. Hot presses are generally used to cure the resin binders and to form the flat boards. Wood veneers have been described in the prior art as facing materials for such boards.

At the present time, there is a wide interest shown in extruded artificial lumber, made from similar wood particles and similar resin binders. The continuous process of extrusion lends itself readily to the economic conditions that govern the availability of wood wastes and allows new and useful shapes to be formed. The conventional apparatus used to make extruded boards comprises a heated expressing die wherein a reciprocating plunger compacts the binder-coated particles together. Such basic extruding apparatus is not new and has been used for years in the manufacture of fuel briquettes. The physical properties of extruded boards differ widely from those of flat pressed boards and their potential uses are, accordingly, quite different.

The prior art disclosures relating to artificial lumber boards, made from interbonded wood particles, are generally based on the assumption that such boards are grainless and homogeneous. This, however, is not the case. The applicant has recognized that the particle orientation within the mass of the board constitutes an artificial grain direction that is caused by the use of uni-directional pressure to form the artificial lumber boards. He has also recognized that the physical properties of the boards are governed, principally, by the said orientation of their internal particles. In his co-pending application, Serial No. 216,403 and issued as U. S. Patent No. 2,717,-420, the applicant describes and claims a method and apparatus for making extruded boards that possess isotropic properties. Such boards are truly grainless since their internal particles are pointed randomly with respect to the three spacial width, breadth and length dimensions of the board.

The boards comprise a mixture of thermosetting synthetic resin and discrete wood or lignocellulosic particles, interbonded into a rigid mass under heat and pressure. A preferred means of making such products is a process of dry extrusion adapted to form boards and slabs of rectangular or other cross-section and of any predetermined length that will be found useful in the building arts as a substitute for natural lumber.

In the applicant's application, Serial No. 216,403 and issued as U. S. Patent No. 2,717,420, there is described and claimed method and apparatus for producing extruded artificial lumber wherein the lignocellulosic particles are randomly positioned in the three cubical dimensions. Such a board possesses isotropic physical properties and, thereby, swells a like degree in length, width and thickness. The present invention proposes longitudinally disposed stress-bearing devices embodied in, or adapted to, ordinary extruded artificial lumber of the type described hereabove to take the place of the special internal structure of the board. The applicant's co-pending application discloses in detail apparatus for extruding artificial lumber and also discloses apparatus for producing artificial lumber which does not have isotropic physical properties. The apparatus of the prior application can be used for making boards which are useful in the present invention. Therefore, the disclosure of co-pending application, Serial No. 216,403 and issued as U. S. Patent 2,717,420, is hereby incorporated by reference in the present application.

Likewise, prior art disclosures describing wood veneer facings applied to a core of artificial lumber do not recognize any grain direction within the core. They do not conceive that the core possesses mechanical properties of its own which are adaptable to those of the veneer facings to form an isodynamically balanced composite board. Such a board, they do not disclose.

Accordingly, the applicant's invention involves a board of artificial lumber, having a length several times its width and several times its thickness. It is made up of an interbonded and consolidated mass of predominately lignocellulosic particles and a resin binder. The lignocellulosic particles are predominately arranged in reticulated layers transverse to the longitudinal axis of the board. The reticulated layers are superimposed on each other longitudinally of the board. In accordance with the invention the board is provided with tension-bearing means longitudinally disposed and intimately connected to the mass of particles, so as to stabilize the board and control its expansion lengthwise in accordance with one embodiment of the invention. This tension-bearing means can take the form of filaments, for example, of metal, fibrous material or any other filament-forming material. These filaments are longitudinally disposed within the cross-section of the board. They are connected to the particles adhesively and mechanically, the filaments preferably presenting a rough surface which engages with the particles. According to an alternative construction within the inventive concept, the reinforcing means take the form of a veneer facing applied to at least one surface of the board and adhesively secured to the particles forming the board. A veneer facing of this type may reinforce more than one surface. Also, in accordance with the invention, the reinforcing means may take the place of tension bearing filaments within the board as described and facing means applied to at least one surface of the board as described. In any event, the reinforcing means has the effect of retaining the board in the longitudinal direction and preventing its expansion in that direction owing to force, such as temporary swelling of the particles.

The invention will be understood in more detail by reference to the preferred embodiments of it which are shown in the accompanying drawings and in which:

Figure 1 shows one form of artificial lumber according to the invention reinforced by longitudinal extending notched metal filaments.

Figure 1a is a greatly enlarged portion of one end of the form shown in Figure 1 to illustrate the internal structure in more detail.

Figure 2 shows an alternative form of the invention being a board of the type described which is reinforced by facing veneers.

Figure 3 shows a further alternative form of the invention in which the board is reinforced by both longitudinal extending filaments and a facing veneer, the mass of the board having been reduced by making one face longitudinally corrugated.

Figure 4 is a fragmentary view of the form of apparatus for making the board according to the invention.

Figure 5 is a vertical cross section along the line 5—5 of Figure 4.

Figures 6, 7, and 8 show board sections embodying alternative filaments.

The present invention is based on a greater awareness of the properties of wood veneers and/or reinforcing elements and artificial lumber used in combination. The present articles are structurally distinguishable from prior disclosures and constitute an original contribution to the art.

The new articles featuring tension-bearing filaments incorporated within the mass of artificial lumber, possess strength and dimensional stability characteristics that are new. Likewise, two and three-ply composite boards comprising core elements of artificial lumber, having an internal particle orientation as described and facing elements of natural wood veneer combined according to the invention. The physical properties of such composite boards derive, in part, from the nature of the core and, in part, from the nature of the facing elements. They are, moreover, determined by the specific manner in which the said elements are combined together.

Figure 1 shows a portion of an elongated board of extruded lumber, having a rectangular cross section. It is made up of a large number of oblong wood or lignocellulosic particles 1 compacted against one another under longitudinally applied pressure. Particles 1 form a rigid mass which is held together by a hardened synthetic resin substance. Oblong particles 1 are approximately prismoidal in shape; they have a length two to five times their width and a width two to ten times their thickness. Four tension-bearing filaments 19 are shown, encased longitudinally within the mass of the board. Filaments 19 are metal wires. They are bonded to the surrounding lignocellulosic particles within the board texture. Metal filaments 19 are indented at intervals along their length by notches 20.

When the top surface 2 of the board (outlined by longitudinal edges 3 and 4 and by transversal edges 5 and 6) is examined, the visible particles appear long and narrow. Each one, according to its size, contacts two or more adjacent visible particles. At times, it will appear slightly bent as it conforms to the said adjacent particles. The particles do not cross each other, but are aligned end to end in thin parallel lines 7 extending from edge 3 to edge 4 of the board. Thin parallel lines 7, wherein the particles are aligned, are perpendicularly transverse to longitudinal edges 3 and 4 of the board.

When the lateral surface 8 (outlined by longitudinal edges 3 and 9 and by transversal edges 10 and 11) is examined, the visible particles have the same appearance and configuration as described above. They are aligned end to end in thin parallel lines 12 which perpendicularly cut across lateral surface 8 between longitudinal edges 3 and 9 of the board.

When the end surface 13 (outlined by transversal edges 6, 11, 14 and 15) is examined, the aspect of the visible particles is completely different from the above description. They generally appear wider. They are directed at all angles. They frequently intersect one another. They overlap abundantly and lie at different depths inwards from end surface 13.

The spacial relationship of the particles, within the mass of the board, is projected into the three coordinated views of surfaces 2, 8 and 13. Since the said three co-ordinated views are not all identical, it can be seen that the board particles do not lie absolutely at random and do not interlock to a like degree along the length, width and thickness dimensions of the board. By means of the three co-ordinated views, we can reconstruct the internal arrangement of the particles and formulate a structural definition of the board.

It is noted that the views of top surface 2 and lateral surface 8 are identical in nature. The view of end section 13 introduces new and different elements regarding the shape, posture and inter-relationship of the particles. In combination, the three views suggest a characteristic grain direction in the subject portion of extruded artificial lumber. This characteristic grain direction will now be examined.

When observed within the top and lateral surfaces 2 and 8 only, the thinner edges of the particles are visible. Within the end section 13, they appear generally longer. Many of them, in this locus, are visible in full outline, exhibiting their actual length and width dimensions. These fully visible particles overlap upon, and partially hide, other similarly shaped and positioned particles. In general, then, the individual particles are erected with their broader dimensions and greater surface, or face, transversely aligned to the length of the board. This transverse erection of the particles results in their faces being substantially parallel to end section 13.

Another feature of the particles, as viewed in end section 13, see particularly Figure 1a, is that their longer dimension is randomly directed upwards, downwards or diagonally across the transverse plane where they are located. Only by chance, will their length dimension be parallel to the outer edges 6, 11, 14 and 15 of end section 13. In addition, a given particle 16 will contact one or more adjacent and co-planar particles 17 and 18 and will intersect them at any possible angle and at any particular point along their length. At their mutual points of contact, the synthetic resin welds the particles together. Such intersecting and interbonded co-planar particles form a transverse network of trussed elements extending across the full width and thickness of the board. Any tension or compression load, applied transversally to the board, is taken up by all the cross-linked and triangulated co-planar particles. It is then distributed within the entire cross section of the board. This characteristic is referred to as transverse reticulation of the particles.

In addition to being erected and reticulated transversely to the length of the board, the particles, when examined in end-section 13, (Figure 1a) are wedged behind one another with their larger surfaces, or faces, in mutual contact. They are thus superimposed upon each other throughout the length of the board.

Taken collectively, they are stratified, or superimposed in more or less unbroken layers parallel to end section 13. These layers correspond, substantially, to the previously described transverse networks of particles. When observed within top surface 2, or lateral surface 8, of the board, the stratified layers of particles appear, respectively, as thin parallel lines 7 and 12. This characteristic is referred to as longitudinal stratification of the particles.

So far, we have described a portion of artificial lumber, shown in Figure 1. Essentially, it is consolidated into a coherent mass under longitudinally applied pressure and the particles within its texture have the following observable characteristics:

(1) They are oblong and approximately prismoidal, in shape.

(2) They are not randomly orientated in space and do not interlock to the same degree along the length of the board as they do in the other dimensions.

(3) They are erected transversally to the length of the board.

(4) They are reticulated transversally to the length of the board.

(5) They are stratified in successive layers which are substantially parallel to each other and substantially transverse to the length dimension of the board.

The above particle characteristics give the board shown in Figure 1, and artificial grain direction which is transverse to its length.

The same portion of artificial lumber, as described above and illustrated in Figure 1, after it has been subjected to a high degree of moisture by soaking in water or submitting to a damp atmosphere for a long period of time would, if not restrained by the wires as described, tend to expand and swell as shown in dotted lines. The dotted lines show by way of an example the extent that a non-reinforced board swells when subjected to the conditions mentioned. This swelling or extension of the board is mainly confined to the length dimension and the width and thickness dimensions remain virtually unchanged.

The explanation is as follows:

According to their lignocellulosic nature, the individual particles do not swell more than one percent along their length dimension, when they are moistened from a dry to a water-soaked condition. On the other hand, they swell between five and ten percent along their width and thickness dimensions. It is further recognized that the length dimension of the particles coincides very closely with their natural grain direction. The particles are, therefore, about twenty times stronger in length than they are in width and thickness.

As seen previously, the individual particles which form the artificial lumber are erected in stratified cross-sectional layers. Their length and width dimensions both lie within said cross-sectional layers. The length dimension of the particles is directed at all possible angles, i. e., upwards, downwards, diagonally, etc., within said cross-sectional layers. Since the principal dimension of the particles, i. e., their length, coincides with their direction of minimum hygroscopic movement and extends at all angles within the board cross section, it communicates to said cross section a maximum degree of dimensional stability.

Not only are the particles erected in stratified cross-sectional layers, their length dimension is aligned randomly within said layers. We have also seen that the co-planar particles belonging to the same cross-sectional layer are linked together at various points along their length. They are reticulated into a trussed network which fully extends across the board cross section. The resinous binder locks the network into a rigid, highly indeformable, stress-carrying element. Since these particles, which constitute the minute members of a trussed network, are stressed along their dimension of greatest resistance, i. e., their length, they confer a maximum degree of rigidity to the width and thickness of the board.

The erected particles also expand in width. If unrestrained, this expansion takes place within the board cross section. However, in the characteristic texture of the board, it is resisted and, to a degree, suppressed by the trussed network of co-planar particles. The widthwise modulus of elasticity of the restrained particles is twenty times smaller than the modulus of elasticity, lengthwise, of the resisting reticulated co-planar particles. The widthwise expansion of the particles is, consequently, largely diverted into a thickness movement which occurs longitudinally of the board.

According to their lignocellulosic nature, the free particles expand in thickness between five and ten percent, when soaked in water. In the present board texture, the erected particles undergo this normal thickness expansion, which is moreover boosted to the order of ten percent, or more, by their diverted movement in width. The thickness expansion of the particles, which are superimposed and non-interlocking longitudinally of the board, directly and cumulatively affects the length dimension of the board. In addition, adsorbed moisture at the interface of the superimposed particles tends to force them away from each other and further increases the length of the board. The board texture, as we have seen, is longitudinally stratified. It does not feature by itself any counteracting system of stressed particles capable of resisting the thickness swelling of the particles. The corollary longitudinal expansion of the board is, thus, measurably greater than the thickness expansion of the free lignocellulosic particles and is of the order of ten percent or more. It is now clear why the board, illustrated in Figure 1, if unreinforced, will show a swelling in length indicated in dotted lines, at least ten times greater than its swelling in thickness and in width.

It is understood that the board shown in Figure 1 is formed by a particular extrusion process. The nature of this process is such that it can produce boards of infinitely variable length. It also allows endless filaments to be fed longitudinally into the mass of the board during formation. The applicants' co-pending U. S. application, Serial No. 216,403, describes and claims a method and apparatus for producing filament-reinforced extruded artificial lumber and Figure 2 of the present drawings illustrates the use of the apparatus of the co-pending application for producing the type of board shown in Figures 1 and 3.

When the subject wire-reinforced board, illustrated in Figure 1, is soaked in water, or otherwise subjected to high humidity, it does not swell more than one percent in width and in thickness. Its lengthwise swelling, however, is considerably restrained by tension-bearing filaments 19 and is of the order of one percent or less of the dry original length of the board.

Metal filaments 19 can be replaced by filaments of twine or cord 19a, see Figure 6, made from natural or synthetic fibers. These substances, in general, have a greater affinity than metal for the synthetic resin binders presently used in extruded artificial lumber. Filaments of natural fiber adhere more readily to the surrounding lignocellulosic particles. Non-metallic filaments have the added advantage of causing less damage to ordinary saws and other woodworking tools.

In the case of metal filaments, their surface can be chemically treated to adhere more firmly to the internal lignocellulosic particles. It can also be roughened, or physically modified, to promote mechanical interlocking with the internal particles. As shown in Figure 1, the surface of metal filaments 19 is indented for this purpose by notches 20. As explained previously, the lignocellulosic particles within the board are erected in stratified layers transverse to the length of the board. As they cross said stratified layers from one end of the board to the other, the longitudinal filaments 19 come in contact with the thin edges of the particles. Since the filaments are provided with numerous superficial notches 20, many adjacent particles protrude edgewise into said notches. In this fashion, the filaments are mechanically anchored to the mass of lignocellulosic particles. When the board is subjected to moisture, the thickness swelling of the individual particles is effectively restrained by counteracting stresses set up in the longitudinal filaments. The number and configuration of tension-bearing filaments 19 can be varied to suit the requirements of any board section. Accordingly, the critical tension stresses sustained by the particles across their layers of stratification are effectively transferred to the filaments.

The indented metal filaments 19, shown in Figure 1, can be replaced by twisted metal wires, 19b, 19c, having a square or triangular cross section respectively, see Figures 7, 8. In this case, the angular ridges of the metal wires follow a helical path throughout the length of the board. A form of mechanical anchorage is effected between said metal wires and the mass of lignocellulosic particles. It is essentially different from the type of anchorage, shown in Figure 1, provided by the notched wires into which the erected particles protrude edgewise. The particles, in this case, are reticulated in rigid transverse layers which close in around the angular cross section of the helically twisted wires. Said rigid layers cannot slip along the wires unless they are transversally rotated in conformity with the helical path of the ridges. Since the transverse layers of reticulated particles, which make up the board cross section, are not free to rotate around the wires, any longitudinal movement on their part is resisted by said wires. Accordingly, the critical tension stresses sustained by the particles across the superimposed reticulated layers are communicated by interfacial thrust from the particles to the helically twisted wires. The transverse reticulated layers are restrained by the wires from moving away from each other. In other words, the length of the board is prevented from expanding even if the particles making up the board absorb moisture.

The manner in which boards of the type described in the present application can be made is disclosed in detail in the applicant's co-pending U. S. application, S. N. 216,403, the disclosure of which is incorporated by reference in the present application. Figures 4 and 5 of the present application show diagrammatically a portion of the apparatus of the prior application in use. Referring to these figures, it will be seen that the apparatus operates as follows.

Steel wire 93 is drawn at constant speed from reel 94 by power rolls 95. This wire can be pre-notched by known means before use in the present apparatus or it can be indented at regularly spaced apart points as it is being fed, for example, by passing it through opposed notching rolls 92 situated in advance of the power rolls 95. It is fed over pulleys 96 and 97, between which it is urged to support weight 98 suspended from pulley 99. In this fashion, it is maintained under constant tension as it is fed through ducts 100 bored through a reciprocating plunger 101. It continues, while taut, to a longitudinally traverse loading chamber 102 wherein the lignocellulosic particles 103 are compacted around it. It becomes permanently welded within the substance of the board 104 as same is formed and progressed through a die 105.

In ordinary extruded artificial lumber the inherent high cross-sectional strength of the board is associated with low longitudinal strength. Many of such boards will break easily along transverse lines of cleavage, leaving a clean fracture. The tension-bearing filaments 19 stretched longitudinally through the present improved board, shown in Figure 1, provide a reinforcing armature to resist such fracture. This improved board will be found suitable for such applications as beams and other structural members in building construction. This invention further provides composite boards as examples of improved extruded artificial lumber.

Figure 2 shows a three-ply laminated sandwich comprising a core element 21 of unreinforced extruded artificial lumber made up of an interbonded and consolidated mass of predominantly prismoidal lignocellulosic particles as previously described. Adhesively secured to core element 21 is a pair of wood veneer outer elements 22 and 23.

By reference to Figure 2, where the facing veneers are partially removed, it is seen that the particles are stratified along the length dimension of core element 21. They are also reticulated transversally along the width and thickness of core element 21. Double-headed arrow 24 indicates the artificial grain direction caused by the stratified layers of reticulated particles. The core element 21 would normally undergo considerable lengthwise expansion when subjected alone to moisture absorption were it not for the restraining facings.

It is also seen, in Figure 2 that the wood veneer outer elements 22 and 23 are disposed with their natural grain direction in mutually parallel alignment indicated by double-headed arrows 26 and 27.

The essential feature of the three-ply laminated sandwich, shown in Figure 2, is that the common grain direction 26 and 27 of outer elements 22 and 23 be perpendicular to the artificial grain direction 24 of core element 21. When the three elements 21, 22 and 23 are bonded together as shown, they form a composite board that is isodynamically balanced. The high cross-sectional stability of core element 21, due to transverse particle reticulation, confers high thickness stability to the board. For the same reason, core element 21 resists the severe across-the-grain expansion and counteraction of wood veneer outer elements 22 and 23. On the other hand, the longitudinal expansion of core element 21, due to longitudinal particle stratification, is restrained by the natural high strength and stability with the grain of wood veneer outer elements 22 and 23.

According to the physical properties of the three chosen elements 21, 22 and 23, the composite board shown in Figure 2 is extraordinarily stable and warp-proof. This type of board will be found useful in building construction, in such applications as movable partitions that require two flat decorative or functional surfaces.

Figure 3 shows a two-ply laminated composite board as an example of improved extruded artificial lumber. It comprises a filament-reinforced backing element 30 of extruded artificial lumber, having a flat upper surface 31 and a corrugated under surface 32. End section 33 of backing element 30 shows the transversally erected and reticulated lignocellulosic particles 34 which form, as explained in the foregoing descriptions, the interbonded and consolidated mass of extruded artificial lumber.

Tension-bearing filaments 35 are imbedded longitudinally within the cross section of backing element 30. They are located at a greater distance inwards from flat upper surface 31, than they are from corrugated under surface 32.

Adhesively secured to flat upper surface 31 of backing element 30 is a facing element 36 of natural wood veneer. The grain direction of said wood veneer facing element, shown by double-headed arrow 37, is disposed longitudinally of backing element 30. Said grain direction 37 of wood veneer facing element 36 is perpendicular to the superimposed transverse planes of reticulated lignocellulosic particles which make up backing element 30. End section 33 exemplifies said transverse planes. Said grain direction of wood veneer facing element 36 is also parallel to longitudinal tension-bearing filaments 35.

In combination, wood veneer facing element 36 and longitudinal filaments 35 are located on either side of the neutral axis of backing element 30 and resist the longitudinal expansion of said backing element. Likewise, the cross-sectional stability and strength of backing element 30 resist the across-the-grain expansion of natural wood veneer facing element 36. The two-ply composite board shown in Figure 3 has similar strength and dimensional stability features as the three-ply board shown in Figure 2. It will be found useful, in building construction, for wall panels, floor slabs and the like, where only one flat surface is required.

I claim:

1. As an article of manufacture, an elongated unitary board of artificial lumber, having a length several times its width and several times its thickness, comprising a resin binder, an interbonded and consolidated mass of predominantly prismoidal lignocellulosic particles and at least one tension-bearing filament longitudinally disposed within and intimately secured to said mass of particles, both particles and filament being bound together by said binder, said lignocellulosic particles being predominantly erected and reticulated in layers perpendicularly transverse to the longitudinal axes of said board and of said tension-bearing filament, said layers being additionally superimposed in advance of one another longitudinally of said board and of said tension-bearing filament.

2. As an article of manufacture, a laminated composite board comprising one element of artificial lumber, adhesively secured between a pair of element plies of natural wood veneer having a common grain direction, said element of artificial lumber comprising a resin binder and an interbonded and consolidated mass of predominantly prismoidal lignocellulosic particles bound thereby, said particles being predominantly erected and reticulated in transverse layers substantially perpendicular to said common grain direction of said pair of elemental plies of natural wood veneer, said transverse layers being additionally superimposed in advance of one another within, and longitudinally of, said element of artificial lumber and longitudinally of said common grain direction of said pair of elemental plies of natural wood veneer.

3. As an article of manufacture, a piece of plywood made up of two plies of natural wood veneer having a common grain direction, and one central ply of artificial lumber, said artificial lumber comprising a resin binder and a mass of interbonded and consolidated predominantly prisomidal lignocellulosic particles bound thereby, said particles being erected and reticulated in layers substantially parallel to the thickness dimension of said central ply of artificial lumber, said layers extending throughout a major dimesion of said piece of plywood in transverse relationship to the common grain direction of said two plies of natural wood veneer.

4. As an article of manufacture, a laminated composite board comprising one element of artificial lumber adhesively secured to one element of natural wood veneer, said element of artificial lumber comprising a resin binder, an interbonded and consolidated mass of predominantly prismoidal lignocellulosic particles and at least one tension-bearing filament longitudinally disposed within, and intimately secured to, said mass of particles, said lignocellulosic particles being predominantly erected and reticulated in layers perpendicularly transverse to the grain direction of said element of natural wood veneer and to the axis of said tension-bearing filament, said layers being additionally superimposed in advance of one another longitudinally of said element of artificial lumber, of said element of natural wood veneer and of said tension-bearing filament.

5. In an elongated unitary board, according to claim 1, a tension-bearing filament in the shape of metal wire.

6. In an elongated unitary board, according to claim 1, a tension-bearing filament in the shape of metal wire having spaced apart indentations along its length.

7. In an elongated unitary board, according to claim 1, a tension-bearing filament in the shape of metal wire having an angular cross section and twisted helically throughout the length of the board.

8. In an elongated unitary board, according to claim 1, a tension-bearing filament made of natural fibers.

9. In an elongated unitary board, according to claim 1, a tension-bearing filament of synthetic fibers.

10. In a laminated composite board, according to claim 4, a tension-bearing filament in the form of metal wire.

11. In a laminated composite board, according to claim 4, a tension-bearing filament in the form of metal wire having spaced apart indentations along its length.

12. In a laminated composite board, according to claim 4, a tension-bearing filament in the form of metal wire having an angular cross-section and twisted helically throughout the length of the board.

13. In a laminated composite board, according to claim 4, a tension-bearing filament of natural fibers.

14. In a laminated composite board, according to claim 4, a tension-bearing filament made of synthetic fibers.

15 In a laminated composite board, according to claim 4, an element of reinforced artifical lumber having a smooth flat surface on one side to which the wood veneer element is adhesively secured, said wood veneer element being level and free from elevations and depressions, said element of reinforced artificial lumber having a longitudinally corrugated surface on the other side.

16. In a laminated composite board, according to claim 4, an element of artificial lumber wherein the tension-bearing filament is located at a greater depth inwards from the surface to which the wood veneer element is adhesively secured than from the other surface.

References Cited in the file of this patent

UNITED STATES PATENTS

| | | |
|---|---|---|
| 1,215,570 | Mix | Feb. 13, 1917 |
| 1,523,105 | Doe | Jan. 13, 1925 |
| 1,872,316 | Meeker | Aug. 16, 1932 |
| 1,969,291 | Antoni | Aug. 7, 1934 |
| 2,014,892 | Graham et al. | Sept. 17, 1935 |
| 2,248,233 | Heritage | July 8, 1941 |
| 2,428,325 | Collins | Sept. 30, 1947 |
| 2,562,976 | Winnick | Aug. 7, 1951 |
| 2,592,470 | Ryberg | Apr. 8, 1952 |
| 2,649,034 | Gramelspacher | Aug. 18, 1953 |